United States Patent

Engström et al.

[11] Patent Number: 5,531,798
[45] Date of Patent: Jul. 2, 1996

[54] ELIMINATING ASH BRIDGING IN CERAMIC FILTERS

[75] Inventors: Folke Engström, Kotka; Juhani Isaksson, Karhula, both of Finland

[73] Assignee: Foster Wheeler Energia Oy, Karhula, Finland

[21] Appl. No.: 249,216

[22] Filed: May 26, 1994

[51] Int. Cl.⁶ .................. C10J 3/84; B01D 46/04
[52] U.S. Cl. .................. 48/77; 48/128; 48/197 R; 48/210; 55/272; 55/302; 55/385.1; 95/26; 95/280; 110/345; 422/147
[58] Field of Search .................. 95/278, 279, 280, 95/26; 55/294, 302, 303, 272, 273, 523, 385.1; 110/345; 48/77, 128, 197 R, 210; 422/147

[56] References Cited

U.S. PATENT DOCUMENTS

| | | | |
|---|---|---|---|
| 3,827,150 | 9/1974 | Kubiak | 55/302 |
| 3,894,854 | 7/1975 | Wolfe | 55/294 |
| 3,951,627 | 4/1976 | Barr, Jr. et al. | 55/284 |
| 4,343,631 | 8/1982 | Ciliberti | 55/302 |
| 4,417,908 | 11/1983 | Pitcher, Jr. | 55/523 |
| 4,525,184 | 6/1985 | Tassicker | 55/302 |
| 4,731,100 | 3/1988 | Loeffelmann et al. | 55/302 |
| 4,812,149 | 3/1989 | Griffin et al. | 55/302 |
| 4,865,627 | 9/1989 | Dewitz et al. | 55/302 |
| 4,865,629 | 9/1989 | Zievers et al. | 55/302 |
| 4,904,287 | 2/1990 | Lippert et al. | 55/302 |
| 5,013,341 | 5/1991 | Isaksson et al. | 55/302 |

FOREIGN PATENT DOCUMENTS

3422592  4/1986  Germany .................. 95/279

Primary Examiner—Jay H. Woo
Assistant Examiner—Duane S. Smith
Attorney, Agent, or Firm—Nixon & Vanderhye

[57] ABSTRACT

In the filtering of high temperature (e.g. greater than 400° C.) and high pressure (e.g. greater than 5 bar) gas—such as produced by pressurized fluidized bed combustion or gasification of coal—there is often a buildup of particles on the supporting elements for the filters, and on surrounding structures. This buildup of particles can damage the filter elements, or greatly reduce their effectiveness. This problem is avoided by periodically automatically cleaning the supporting and/or surrounding surfaces of the filters, as by directing high pressure gas streams at the supporting and/or surrounding surfaces. The filters may also be backflushed with compressed gas, as is conventional, at the same time as, or at different times than, when the supporting and/or surrounding structures are cleaned. Conduits with nozzles may be mounted directly on the supporting and/or surrounding surfaces and connected by a pipe with an automatically controlled valve to a source of high pressure fluid.

23 Claims, 5 Drawing Sheets

ELIMINATING ASH BRIDGING IN CERAMIC FILTERS

BACKGROUND AND SUMMARY OF THE INVENTION

There are many situations in which high temperature filters are utilized to clean gases by removing particles from the gases. One of the most significant applications of high temperature filters (such as ceramic filters) is at the filtering of small particles from high temperature gases produced during the pressurized combustion or gasification of carbonaceous fuels, such as coal. Some of the high temperature filters utilized for this environment are shown in U.S. Pat. Nos. 4,343,631, 4,417,908, 4,525,184, 4,904,287, the disclosures of which are hereby incorporated by reference herein. Typically the filtering elements comprise ceramic candle filters, ceramic honey combs, ceramic tubes, or alternating layers of gas permeable ceramic membranes corrugated sheets.

Standard procedure for cleaning ceramic filters in these environments is to provide periodic backflushing of the ceramic filters utilizing a high pressure gas stream. Such a system, if employed effectively, such as in the manner that was created in some of the above identified patents, successfully keeps the filters per se clean enough to effectively perform the filtering function over relatively long time periods. However, it has been found that especially for filtering systems used with pressurized fluidized bed combustion or gasification of solid carbonaceous fuel (such as coal), where gases having a temperature of over about 400° C. and at a pressure of about 5 bar or above are produced, and they are heavily laden with particles, ceramic filters fail more quickly than predicted or desired. According to the present invention it has been found that the result of this failure is a high buildup of particles on surfaces supporting and/or surrounding the filters, a phenomenon that may be denoted "ash bridging". This buildup of particles can result in high lateral forces that are applied to the filter elements, or can result in gradual clogging of some of the filter surfaces.

The problem of ash bridging is not solved by conventional backflushing used to clean the filters, and as a matter of fact the backflushing may under some circumstances even intensify the ash bridging problem by directing very high velocity particles at supporting or surrounding surfaces. Also the thermal gradients that can often occur during backflushing may, in combination with the ash bridging, accelerate filter failure, particularly for ceramic candle filters.

According to the present invention, not only has the problem of ash bridging been identified in association with ceramic filters in high temperature environments, particularly for ceramic filters where the gas to be filtered is at high temperature and pressure and heavily particle laden (e.g. as from the pressurized fluidized bed combustion or gasification of coal), typically at temperatures above about 400° C. and pressures above about 5 bar, but the invention also solves the problem.

The invention comprises both a method and apparatus for solving the problem of particle buildup and ash bridging associated with filtering systems for high pressure and temperature gases. The invention solves the problem by automatically cleaning the supporting and surrounding surfaces. While this cleaning may be accomplished in different manners, a preferred mechanism for effecting cleaning is to direct high pressure streams of compressed gas, steam, or a like fluid at the surfaces where buildup is likely to occur. The fluid streams are directed at spaced points and times, e.g. periodically, intermittently, or in response to sensing of the flow volume of gases, or other conditions that might be indicative of buildup of particles.

According to one aspect of the present invention, a method of operating a pressurized gas filtering system comprising a plurality of filtering elements having a first side for contact with particle laden gas, and a second side through which filtered gas passes, and mounted by and/or adjacent to supporting and supporting surfaces is provided. The method comprises the steps of: (a) substantially continuously introducing superatmospheric pressure particle laden gas into contact with the first side of the filtering elements so that the gas passes through the filtering elements, and the filtering elements remove particles therefrom, (b) while practicing step (a) withdrawing filtered gas from the second side of the filtering elements, and (c) at spaced points in time automatically cleaning the supporting and surrounding surfaces of filtering elements to prevent buildup of particles on the supporting and/or surrounding surfaces that would adversely act upon the filtering elements. There preferably is also the further step (d) of, at spaced points in time, backflushing the filtering elements by directing a pulse of cleaning gas through the filtering elements from the second side to the first side at a pressure greater than the pressure of the gas introduced in step (a).

Step (a) is typically practice by introducing gas at a pressure of about 5 bar or more and at a temperature of about 400° C. or more, such as gas from the pressurized fluidized bed combustion or gasification of solid carbonaceous fuel such as coal. Step (c) is preferably practiced by directing pulses of fluid at the supporting and/or surrounding surfaces, the fluid at a high enough pressure to effect removal of particles from the supporting and/or surrounding surfaces, the fluid typically comprising compressed gas (e.g. air or an inert gas such as nitrogen or argon) or steam. Step (c) is advantageously practiced periodically, or intermittently. Steps (c) and (d) may be practiced substantially simultaneously, or at different intervals.

The filtering elements may comprise ceramic candle filters mounted by mounting collars having a first dimensions of elongation and connected to a first substantially planar wall structure generally perpendicular to the first dimension, and wherein some of the mounting collars may be adjacent a second wall structure generally parallel to the first dimension, corners being provided between the mounting collars and first wall structure, and between the first and second wall structures. In this case the practice of step (c) typically includes directing the fluid directly into the corners.

According to another aspect of the present invention a superatmospheric pressurized filter and assembly is provided. The assembly comprises the following elements: A pressure vessel having an inlet for superatmospheric pressure particle laden gas, and an outlet for clean, filtered gas. A plurality of filter elements each having a first side for contacting particle laden gas, and a second side through which filtered gas flows. Means for mounting the filter elements within the vessel so that particle laden gas flows through the first sides of the elements, particles collecting thereon, the means including a supporting structure for the filter elements, and surrounding structures adjacent to some of the filter elements. And means for automatically directing superatmospheric pressure fluid at the supporting and/or surrounding structures to prevent buildup of particles on the surfaces which would adversely affect operation of the filter elements.

The pressurized fluid directing means typically comprises a plurality of fluid conduits extending adjacent the supporting and/or surrounding structures, and having nozzles formed therein. If the filters are ceramic candle filters—as described above—the fluid directing means may include means for directing the pressurized fluid directly into the corners. The fluid directing means typically further includes an automatically operated valve disposed in a pipe connecting the fluid conduits to a source of gas under superatmospheric pressure, and means for periodically operating the valve.

Typically the inlet to the pressure vessel is connected to a pressurized circulating fluidized bed reactor for combusting or gasifying solid carbonaceous fuel. A cyclone separator, or like "large" particle separator, is normally provided between the reactor and the filter means.

The supporting means typically comprises a generally vertical wall structure from which a filter element extends generally horizontally—when the filter elements are honeycomb ceramic filters, or the like—and the fluid conduits are mounted on the generally vertical wall structure. Backflushing means are typically also provided for periodically directing high pressure clean fluid into contact with the second side of the filter elements to pass through the filter elements and dislodge particles which collect on the actual filtering surfaces (that is on the filter elements first side).

According to yet another aspect of the present invention a method of operating a fluidized bed reactor and a plurality of filtering elements mounted by supporting structures in operative association with gases from the reactor is provided. The method comprises the steps of substantially continuously and sequentially: (a) chemically reacting carbonaceous fuel in the reactor to produce a particle-laden gas at a temperature greater than about 5 bar and a temperature of greater than about 400 degrees C., (b) removing large particles from the particle-laden gas, (c) passing the gas into contact with the filtering elements so that particles are separated from the gas, and (d) periodically directing clean fluid at a pressure greater than the pressure of the gas in step (a) directly at the supporting structures for the filter elements to remove particles therefrom, and prevent buildup of particles thereon.

It is the primary object of the present invention to provide more effective filtering of particle laden gases, particularly in superatmospheric pressure and high temperature environments, or other situations in which ash bridging can occur. This and other objects of the invention will become clear from an inspection from the detailed description of the invention and from the appended claims.

DETAILED DESCRIPTION OF THE DRAWINGS

Figure 1:
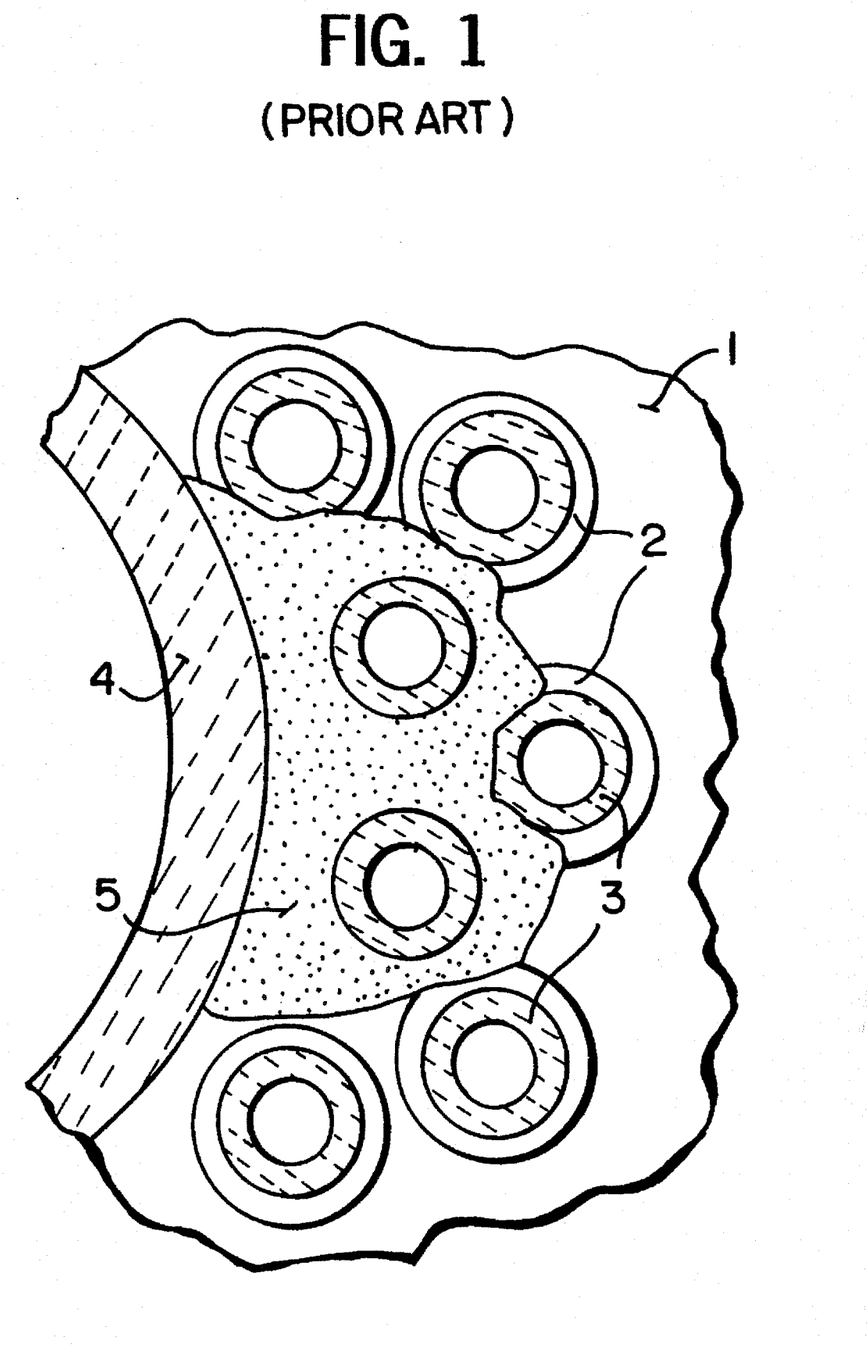
FIG. 1 is a horizontal cross-sectional view, partly in elevation, of an exemplary prior art ceramic candle filter filtering system for use with a pressurized fluidized bed reactor, FIG. 1 illustrating an ash bridging problem that occurs in the prior art.

FIG. 1 schematically illustrates a problem that occurs in association with prior art filters, that is solved according to the present invention. While FIG. 1 illustrates ceramic candle filters, it should be understood that other versions of the same problem occur with other types of filtering elements in pressurized high temperature environments such as ceramic honeycomb filters, and filters using alternating layers of gas permeable ceramic membranes and corrugated sheets.

FIG. 1 illustrates a planar wall structure 1 which supports a number of collars 2 which mount filter candles 3. The filter candles 3, typically of ceramic material, porous to air but not to particles contained within the air, extend generally perpendicular to the surface 1. A central cluster pipe 4 is typically also provided, or other surrounding structures are associated with the filter candles 3.

FIG. 1 also shows an ash bridge 5, which comprises a collection of particles which have attached themselves to the supporting and surrounding surfaces for the candles filters 3. That is the particles formed in the ash bridge 5 have attached themselves to the wall structure 1, the collars 2, and the cluster center pipe 4. As the ash bridge 5 grows it exerts lateral forces on the filter candles 3, which can cause the candles to fail. Also the ash bridge 5 eventually covers part of the filtering surface of the candles 3, and thermal gradients that are caused by the conventional backflushing of the candles 3 to remove particles that have collected thereon also can cause premature failure. Not only does the conventional backflushing not solve the ash bridging problem, under some circumstances it may actually contribute to it.

Figure 2A:
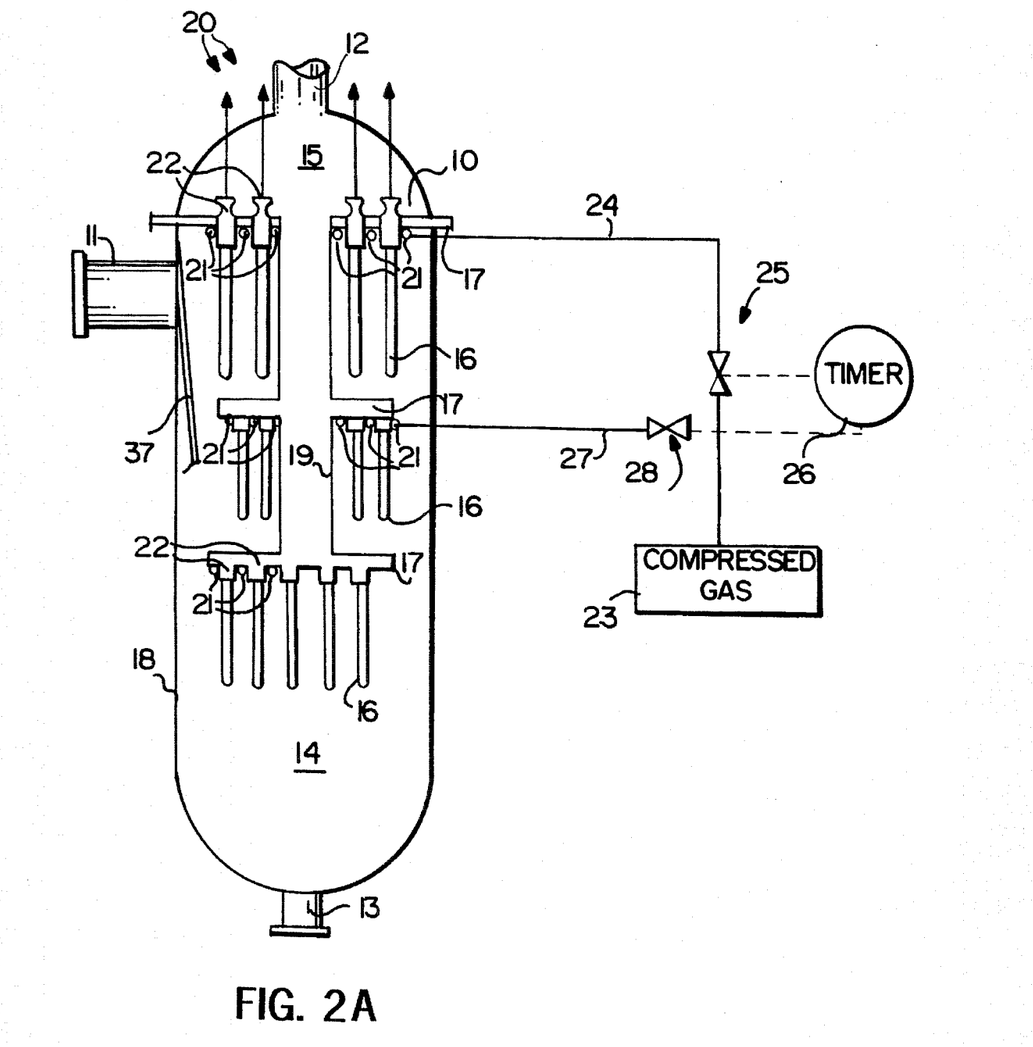
FIGS. 2A and 2B are a side views, partly in cross-section and partly in elevation, of two similar embodiments of an exemplary filtering system according to the present invention.

A superatmospheric pressurized filtering assembly according to the present invention is shown schematically in FIG. 2A. The system includes a pressure vessel 10 having an inlet 11 for superatmospheric pressure particle-laden gas, and outlet 12 for clean filtered gas, and a discharge outlet 13 for removal of filtered particles which fall to the bottom of the vessel 10. The particle-laden gas circulates in the volume 14 while the clean filtered gas is withdrawn in the volume 15, the gas passing through the ceramic filter candles 16, coming in contact with the exterior (first) side of the candles 16. The candles 16 may be just like the candles 3 illustrated in FIG. 1, and the inner, second, surface thereof is in contact with the clean gas volume 15. Generally horizontally extending planar wall structures 17 are provided for mounting the candle filter 16, which filter 16 extends generally perpendicular to the wall structure 17. At some locations, for some filter elements 16, they are adjacent the surrounding structures in the form of the interior wall 18 of the pressure vessel 10 and a central cluster pipe 19, which is provided to mount some of the wall structures 17, and provides communication between second sides of the filter element 16 and the clean gas volume 15.

A conventional filter backflushing arrangement is also provided, indicated for just a few of the filters 16 by the reference numeral 20 in FIG. 2A but it is to be understood that some sort of backflushing arrangement is typically associated with each of the filter elements 16. Backflushing systems, which are conventional per se and shown, for example, in U.S. Pat. Nos. 4,343,631, 4,525,184, and 4,904,287, introduce clean gas at a pressure higher than the pressure of the gas entering conduit 11. The clean gas pulses dislodge particles that have been trapped on the first side of the filter 16 in the compartment 14.

Each candle filter 16 is typically mounted by collars 22 to the wall structure 17, and it is the collars 22 as well as surrounding structures, such as the wall structure 17, and the conduit 19 and even under some circumstances the wall 18, on which particles may collect and cause ash bridging problems. This is solved according to the present invention by providing a structure for automatically cleaning the supporting and/or surrounding surfaces (e.g. 17, 22, 19) to prevent buildup of particles thereon which buildup of particles would adversely affect the filter elements 16, either by interfering with their performance as filters, or causing premature breakage or other damage.

In the preferred embodiment of the invention the automated cleaning means comprises means for automatically directing superatmospheric pressure fluid at the supporting and/or surrounding structures 17, 19, 22, etc. to prevent the buildup of particles. For example, as illustrated schematically in FIG. 2A a plurality of fluid conduits 21 are provided extending adjacent the supporting and/or surrounding structures 17, 19, 22, etc. and having nozzles formed therein for directing the flow of high pressure fluid—for example, compressed gas or steam—at the surrounding or supporting structures. Typically the pressure of the cleaning fluid is higher than the pressure of the gas to be cleaned [introduced in the inlet 11], and typically also always over 5 bar. A baffle 37 is normally provided to substantially evenly distribute the gas entering inlet 11 to all the filter elements 16 within vessel 10.

The conduits 21 are—as shown only for some conduits in FIG. 2A—connected up to a source 23 of compressed fluid, such as a gas compressor or compressed air tank, e.g. for air or an inert gas such as nitrogen or argon, or for steam. The pipe 24 connecting the conduits 21 with the source 23 has an automatically operated valve 25 therein which is controlled, for example, by a timer 26, a sensor, or the like, to at spaced points in time (e.g. periodically, in response to given amount of flow of gas into the inlet 11, intermittently, etc.) open the valve 25 to allow free flow of clean compressed gas from the source 23 through the nozzles and the conduits 21. A different pipe—e.g. see pipe 27 in FIG. 2A—may be provided associated with each set of conduits 21 so that various conduits 21 are supplied with compressed gas at different points in time, another automatically operated valve 28 being provided in the conduit 27, and also controlled by the timer 26.

Figure 2B:
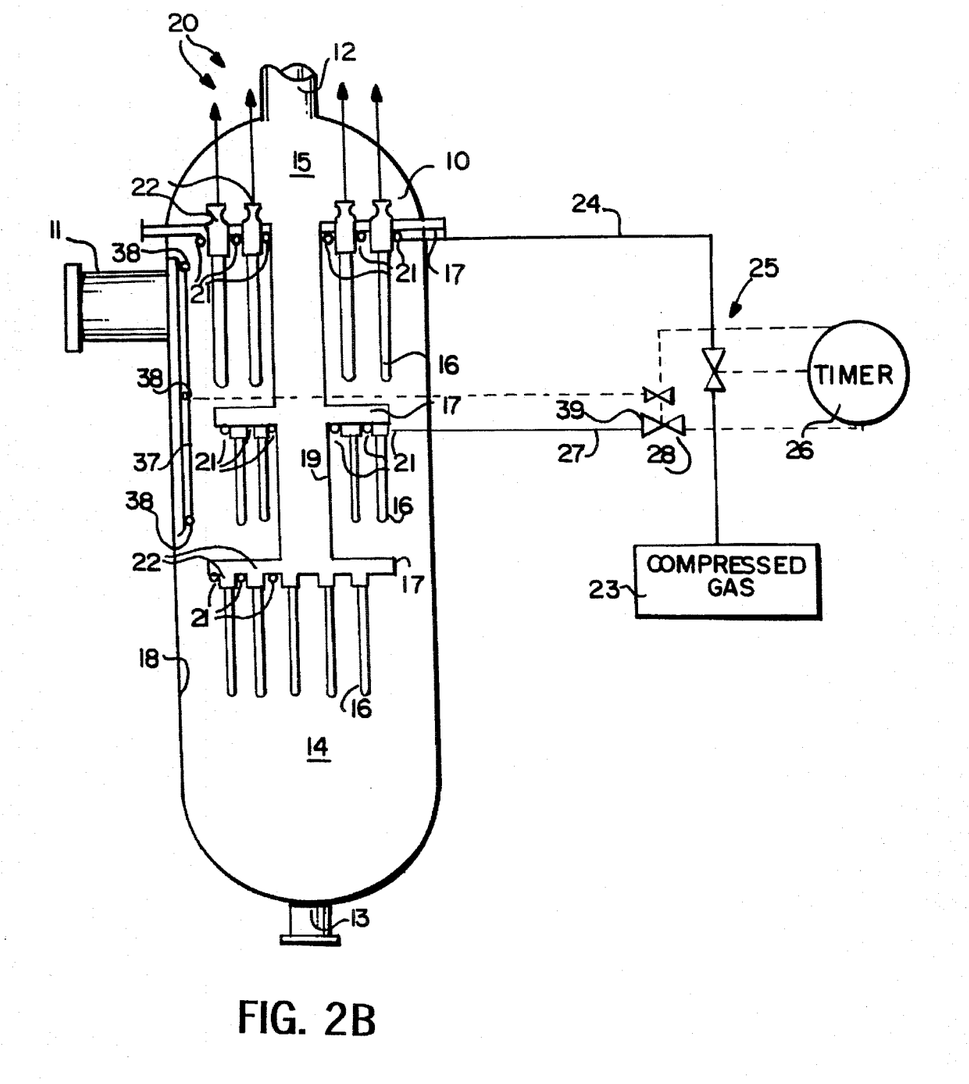

FIG. 2B shows a system substantially identical to that in FIG. 2A except for the positions of the pulse lines at the top of the vessel 10, and the provision of cleaning structures for the baffle 37. In FIG. 2B the baffle 37 has cleaning conduits 38 mounted thereon substantially the same as the conduits 21, and for periodically or intermittently receiving clean fluid blasts from the source 23 by operation of valve 39 controlled by timer 26.

Figure 3:
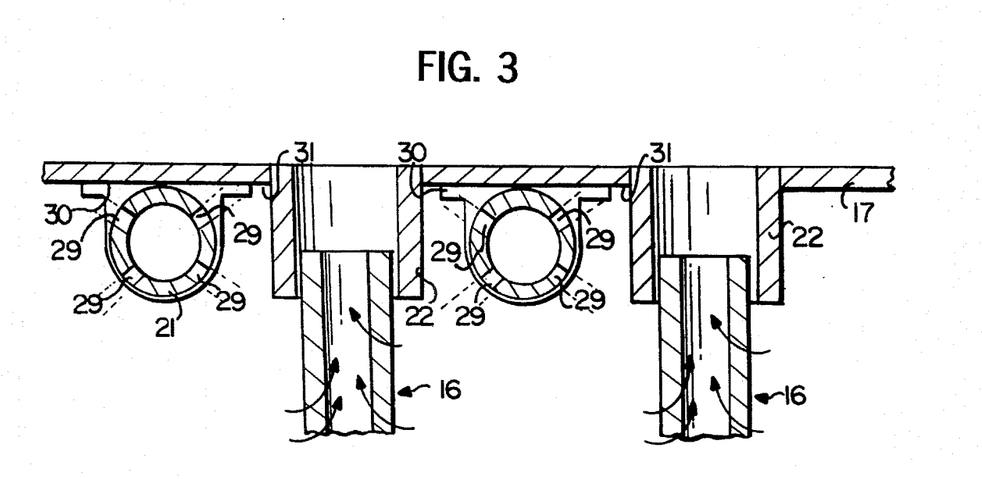
FIG. 3 is a detailed side view, partly in cross-section and partly in elevation, showing the ash bridging preventing cleaning means according to one exemplary embodiment of the present invention.

FIG. 3 shows the conduits 21 in larger scale, in association with the attachment collars 22 which form gas seals with the supporting wall structure 17 and the filter candle 16. In FIG. 3 the openings or nozzles (which may merely be formed by simple holes, or restricted orifices, or inserts) are shown by reference numerals 29, and are positioned around each of the conduits 21 so as to direct fluid streams at the supporting and surrounding structures 22, 17, etc. The cleaning fluid streams are illustrated schematically as emanating from the openings 29 in FIG. 3.

The conduits 21 may be mounted directly to the wall structure 17, as by U-shaped clamps or bands 30, or they may be formed integrally with the wall structure 17, may be welded or otherwise attached to the wall structure 17 or the collars 22, or they may be attached in wide variety of other manners as long as the attachment is secure and provides positive direction to the high pressure streams emanating from the nozzles 29 so that they impact the surfaces 17, 22, 19, etc. Holes 29 will only be provided where particle buildup is likely to occur, and are spaced along the length of the conduit 21. Corners 31 are provided between the wall structure 17 and the collars 22, and/or between the wall structures 17, 19, 18, etc. and in order to effect optimum cleaning some of the nozzles 29 direct high pressure fluid directly into the corners 31, as illustrated in FIG. 3.

Figure 4:
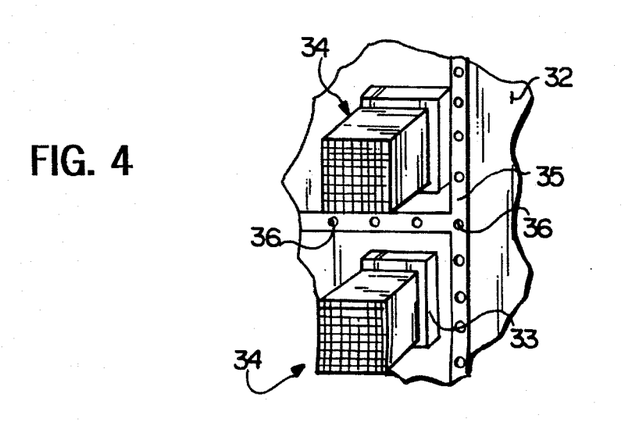
FIG. 4 is a detailed perspective view of another embodiment according to the present invention.

FIG. 4 illustrates another exemplary embodiment according to the invention. This embodiment, which is particularly suited for ceramic honeycomb filters or ceramic membranes sandwiched between pieces of corrugated material, includes a substantially vertical wall structure 32, which may curved or planar, with mounting structures 33 formed therein at spaced vertical locations through which the ceramic honeycomb filters or the like 34 extend. In this case a conduit 35 is provided mounted directly to the vertical wall 32 by any suitable means, with the nozzles or openings 36 formed therein at spaced locations, the nozzles 36 directed so as to cause high pressure fluid to impinge directly upon the wall 32 and/or mounting structures 33 so as to keep them free of particle buildup.

Figure 5:
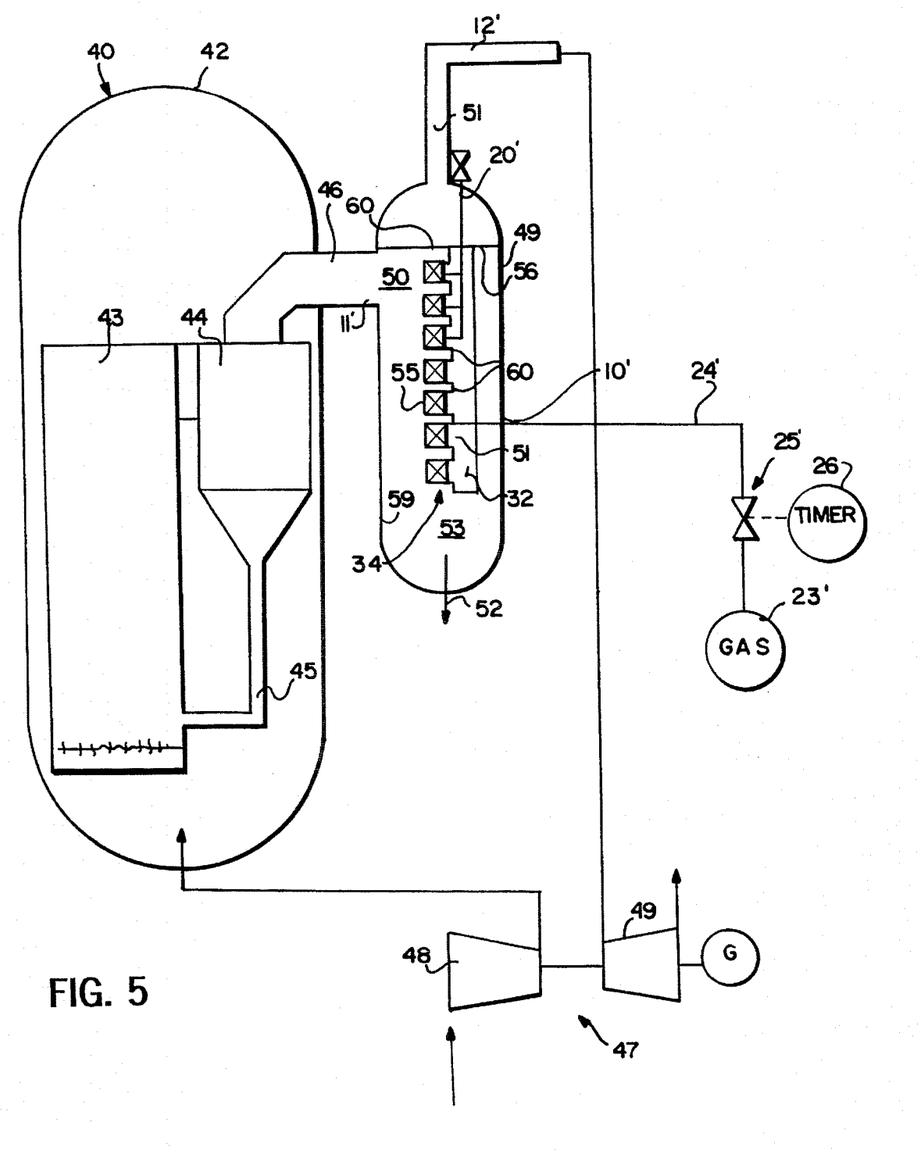
FIG. 5 is a side view, partly in cross-section and partly in elevation, showing another embodiment of filtering assembly according to the present invention connected up to a pressurized fluidized bed reactor for combustion or gasification of solid carbonaceous fuel.

FIG. 5 illustrates an exemplary filtering system according to the present invention—utilizing filters such as illustrated in FIG. 4—in association with a pressurized fluidized bed reactor 40. The reactor 40 includes a pressure vessel 45 in which a fluidized bed reactor 43 is disposed. The reactor 43, for example, burns or gasifies solid carbonaceous fuels such as coal, producing high temperature (typically over about 400° C.), high pressure (typically over 5 bar), particle-laden gas. The gas is initially passed into a large particle separator, such as the conventional cyclone separator 44, and the large particles are recycled to the reactor 43 by a conduit 45. The high pressure, high temperature gas—then still laden with small particles—passes through conduit 46 to the pressure vessel 10' for the filtering system. A gas compressor/turbine system 47 is connected to the reactor system 40. Air is compressed by the compressor 48 and introduced into the pressure vessel 42 to maintain the volume surrounding the reactor 43 and separator 44 at superatmospheric pressure. The filtered gas from outlet 12' of the filter pressure vessel 10' passes to the generator 49 to generate electricity.

The vessel 10' is the same as the vessel 10 only the filtering system is different, comprising the central conduit 51 which defines the wall structure 32 (see FIG. 4) and with the filter elements 34 extending outwardly therefrom. Backflushing of the filter elements 34 is provided by the backflushing system 20 as is conventional, while the conduits 35 are provided with compressed gas from the source 23' via the pipe 24', the valve 25' being controlled by the timer 26' or the like.

Under some circumstances it may be desirable to control the backflushing systems 20' so that they are operated at the same time that cleaning fluid is directed through the valves 25, 25', or the cycles for backflushing and cleaning may be different. The exact nature of the cleaning fluid from the compressors 23 will depend upon availability of fluids, such as availability of access steam, and perhaps upon the particular operating requirements, fuel, and the like for the reactor system 40.

It will thus be seen that according to the present invention method and apparatus have been provided which simply and efficiently solve a significant problem in the prior art. While the invention has been herein shown and described from what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and process.

What is claimed is:

1. A method of operating a pressurized gas filtering system comprising a plurality of filtering elements having a first side for contact with particle laden gas, and a second side through which filtered gas passes, and mounted by or adjacent supporting and surrounding surfaces; said method comprising the steps of:

(a) substantially continuously introducing superatmospheric pressure particle laden gas into contact with the first side of the filtering elements so that the gas passes through the filtering elements, and the filtering elements remove particles therefrom;

(b) withdrawing filtered gas from the second side of the filtering elements; and (c) while practicing step (a), at spaced points in time automatically cleaning the supporting and surrounding surfaces of filtering elements to prevent buildup of particles on at least one of the supporting and surrounding surfaces that would adversely act upon the filtering elements.

2. A method as recited in claim 1 wherein step (a) is practiced by introducing gas at a pressure of at least about 5 bar and at a temperature of about 400 degrees C.

3. A method as recited in claim 2 wherein step (c) is practiced by directing pulses of fluid at the supporting and/or surrounding surfaces, the fluid at a pressure high enough to effect removal of particles from at least one of the supporting and surrounding surfaces.

4. A method as recited in claim 3 wherein step (c) is further practiced by directing compressed gas or steam at the supporting and surrounding surfaces.

5. A method as recited in claim 4 wherein step (c) is practiced periodically.

6. A method as recited in claim 5 wherein step (a) is further practiced by introducing gas from the pressurized fluidized bed combustion or gasification of solid carbonaceous fuel.

7. A method as recited in claim 6 wherein the filtering elements are ceramic candle filters mounted by mounting collars having a first dimension of elongation and connected to a first substantially planar wall structure generally perpendicular to the first dimension, and wherein some of the mounting collars are adjacent a second wall structure generally parallel to the first dimension, corners being provided between the mounting collars and first wall structure and between the first and second wall structures; and wherein the practice of step (c) includes directing the compressed air or steam directly into the corners.

8. A method as recited in claim 4 wherein step (c) is practiced by directing the compressed gas or steam at a pressure of at least about 5 bar.

9. A method as recited in claim 7 comprising the further step (d) of, at spaced points in time, backflushing the filtering elements by directing a pulse of cleaning gas through the filtering elements from the second side to the first side at a pressure greater than the pressure of the gas introduced in step (a).

10. A method as recited in claim 9 wherein steps (d) and (c) are both practiced periodically,' and substantially simultaneously.

11. A method as recited in claim 1 wherein step (c) is practiced by directing pulses of fluid at the supporting and surrounding surfaces, the fluid at a pressure high enough to effect removal of particles from the supporting surrounding surfaces.

12. A method as recited in claim 1 wherein step (c) is practiced by periodically directing compressed gas or steam at the supporting and surrounding surfaces.

13. A method as recited in claim 2 wherein step (a) is further practiced by introducing gas from the pressurized fluidized bed combustion or gasification of solid carbonaceous fuel.

14. A method as recited in claim 1 wherein the filtering elements are ceramic candle filters mounted by mounting collars having a first dimension of elongation and connected to a first substantially planar wall structure generally perpendicular to the first dimension, and wherein some of the mounting collars are adjacent a second wall structure generally parallel to the first dimension, corners being provided between the mounting collars and first wall structure and between the first and second wall structures; and wherein the practice of step (c) includes directing the fluid directly into the corners.

15. A method as recited in claim 1 comprising the further step (d) of, at spaced points in time, backflushing the filtering elements by directing a pulse of cleaning gas through the filtering elements from the second side to the first side at a pressure greater than the pressure of the gas introduced in step (a).

16. A superatmospheric pressurized filtering assembly comprising:

a pressure vessel having an inlet for superatmospheric pressure particle laden gas, and an outlet for clean, filtered gas;

a plurality of ceramic candle filter elements each having a first side for contacting particle laden gas, and a second side through which filtered gas flows;

means for mounting said filter elements within said vessel so that particle laden gas flows through the first sides of the elements, particles collecting thereon, said means including a supporting structure for said filter elements, and surrounding structures adjacent to some of said filter elements;

means for automatically directing superatmospheric pressure fluid at at least one of said supporting and surrounding structures to prevent buildup of particles on said surfaces which would adversely affect operation of said filter elements;

wherein said supporting structure comprises a mounting collar for each candle filter, having a first dimension of elongation and connected to a first substantially planar wall structure generally perpendicular to the first dimension, and said surrounding structures include a second wall structure adjacent some of said candle filters and generally parallel to the first dimension corners being provided between the mounting collars and first wall structure and between the first and second wall structures; and said fluid directing means including means for directing fluid directly into said corners.

17. An assembly as recited in claim 16 wherein said pressurized fluid directing means comprises a plurality of fluid conduits extending adjacent said supporting and surrounding structures and having nozzles formed therein.

18. An assembly as recited in claim 17 wherein said fluid directing means further includes an automatically operated valve disposed in a pipe connecting said fluid conduits to a source of gas under superatmospheric pressure, and means for periodically operating said valve.

19. An assembly as recited in claim 16 wherein said inlet to said pressure vessel is connected to a pressurized circulating fluidized bed reactor for combusting or gasifying solid carbonaceous fuel.

20. An assembly as recited in claim 17 wherein said supporting means comprises a generally vertical wall structure from which said filter elements extend generally horizontally, said fluid conduits mounted on said generally vertical wall structure.

21. An assembly as recited in claim 16 further comprising backflushing means for periodically directing high pressure clean fluid into contact with said second sides of said filter elements to pass through said filter elements and dislodge particles which collect on said filter elements first side.

22. A method of operating a fluidized bed reactor including a pressurized fluidized bed reactor and a plurality of filtering elements mounted by supporting structures in operative association with gases from the reactor, comprising the steps of substantially continuously and sequentially:

(a) chemically reacting carbonaceous fuel in the reactor to produce a particle-laden gas at a temperature greater than about 5 bar and a temperature of greater than about 400 degrees C.;

(b) removing large particles from the particle-laden gas;

(c) substantially continuously passing the gas into contact with the filtering elements so that particles are separated from the gas; and (d) while practicing step (a) periodically directing clean fluid at a pressure greater than the pressure of the gas in step (a) directly at the supporting structures for the filter elements to remove particles therefrom, and prevent buildup of particles thereon.

23. A method of operating a gas filtering system in connection with a fluidized bed combustion or gasification of solid fuel, comprising a plurality of filtering elements having a first side for contact with particle laden gas, and a second side through which filtered gas passes, and mounted by or adjacent supporting and surrounding surfaces; said method comprising the steps of:

(a) substantially continuously introducing particle laden gas from the fluidized bed combustion or gasification of solid fuel into contact with the first side of the filtering elements so that the gas passes through the filtering elements, and the filtering elements remove particles therefrom;

(b) withdrawing filtered gas from the second side of the filtering elements;

(c) while practicing step (a), at spaced points in time automatically cleaning at least one of the supporting and surrounding surfaces of filtering elements to prevent buildup of particles on at least one of the supporting and surrounding surfaces that would adversely act upon the filtering elements.

\* \* \* \* \*